United States Patent Office 3,058,733
Patented Oct. 16, 1962

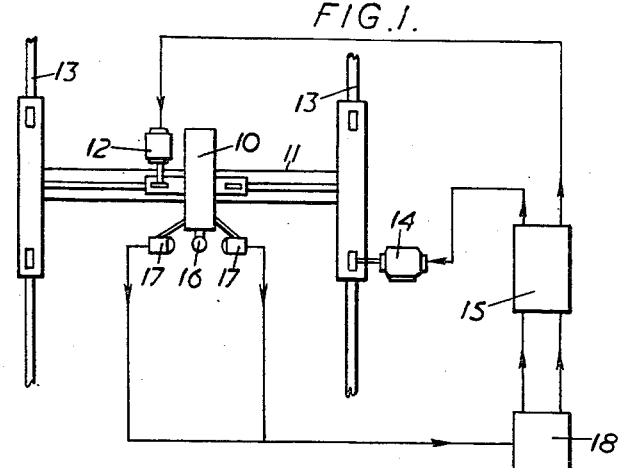
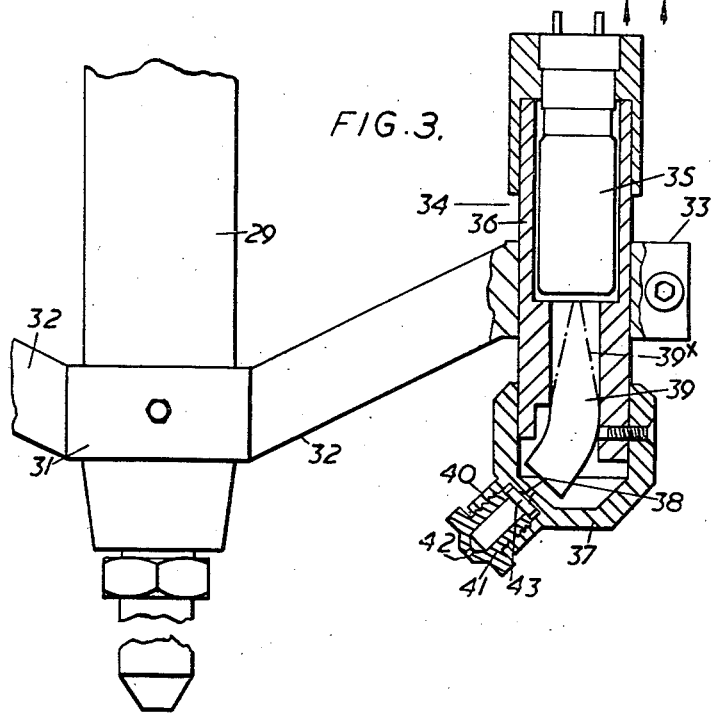

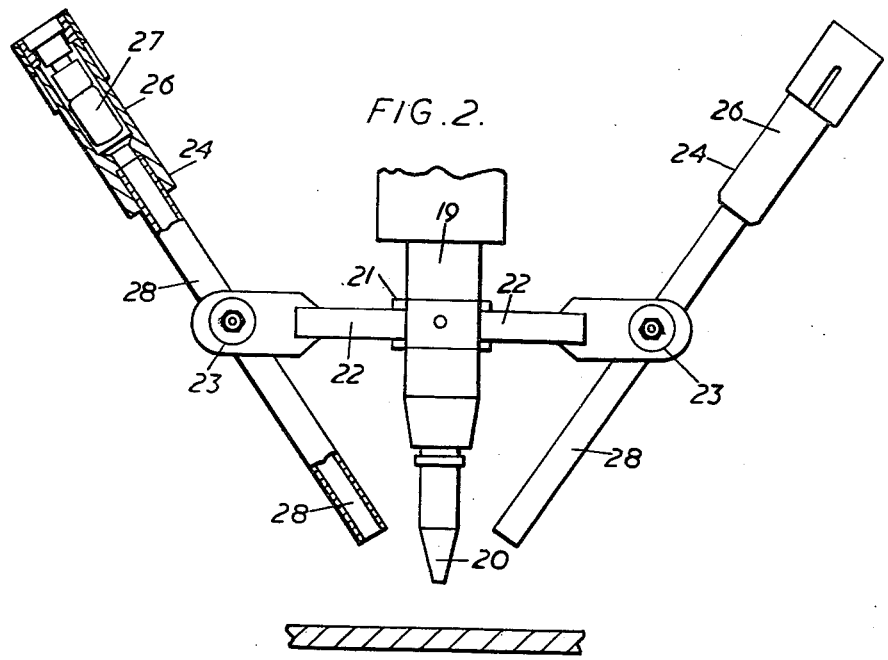

3,058,733
CONTROL OF AUTOMATIC FLAME-CUTTING MACHINES
Charles F. Steventon, Edmonton, London, and Brian Edmund King, Harlow, England, assignors to The British Oxygen Company Limited, a British company
Filed July 10, 1959, Ser. No. 826,308
Claims priority, application Great Britain July 11, 1958
2 Claims. (Cl. 266—23)

This invention relates to automatic flame cutting machines, an "automatic machine," for the purposes of this specification, meaning a machine in which a cutting head carrying a cutting torch is not guided manually by an operator, but is guided automatically to follow a predetermined path. Thus "automatic machines" may range from semi-automatic machines in which a torch is guided to reproduce the shape of a template traversed by a follower or a machine in which a line is traced by a photo-electric device, to a fully automatic machine in which a torch is guided by a pre-recorded record, as described in co-pending patent application No. 773,491, filed November 12, 1958.

In both semi-automatic and fully automatic machines, it becomes important that the torch movement should be halted if the cutting action of the torch should fail, an occurrence known as "loss of cut" which happens when the work is not at a high enough temperature in the zone of the stream of cutting oxygen. Similar considerations apply in the event of the preheat flame being extinguished for any reason.

The use of a photo-electric device for sensing the presence or absence of flame at the torch nozzle readily suggests itself, and since the light emitted by the flame is augmented during cutting by light emitted from the hot work in the cutting zone, detection of loss of cut is also possible, because it will be evidenced by a drop in the output of the photo-electric device.

It has been found in practice, however, that a photo-electric device which was mounted on a cutter head to receive light emitted by a cutting operation does not always operate successfully, because a stoppage of the movement of the cutter head was sometimes effected by the photo-electric device when cutting was actually proceeding satisfactorily.

The explanation of this phenomenon was found to reside in the fact that the cutter head and the photo-electric device bear a fixed positional relationship, whereas the head is moved in all directions relative to the work for contour cutting without rotational movement about the vertical axis of the head and torch. In circumstances where the motion of the cutter head is in the direction of a line between the torch and the photo-electric device and towards the latter, it has been found that the output of the photo-electric device may fall so low that stoppage of the movement of the cutter head may be effected when no loss of cut has occurred. The reason is thought to be that in this direction of movement of the head the photo-electric device is not receiving sufficient of the light emitted from the hot work in the cutting zone, due perhaps to the masking action of the uncut metal combined with the constant motion of the head in direction away from the cutting zone and towards the photo-electric device.

According to the invention, an automatic flame-cutting machine is provided with at least two photo-electric devices disposed at different angular positions spaced about the axis of the torch and cutter head of the machine so that light emitted during a cutting operation impinges upon both said devices, said devices being in parallel with each other and means being provided for halting the motion of the cutter head when the combined output of said devices indicated loss of cut or extinction of the preheat flame of the torch.

In the use of photo-electric devices in conjunction with automatic control of a flame-cutting machine, the devices cannot be positioned in close proximity to the torch tip because of the heat of the cutting operation, but when at a safe distance from the torch tip as regards heating it is found necessary to utilise an optical system in association with a photo-electric device. It has also been found that both extraneous light and occasional cascades of sparks from the cutting operation can lead to surges of undesirably high output by the devices.

In a further feature of the invention, light-conveying ducts extend from the vicinity of the cutting torch tip to the respective photo-electric devices, and act to exclude extraneous light therefrom.

The ducts may be straight tubes of metal or other suitable opaque material, having their ends near the cutting torch open and the other ends secured to the photo-electric devices to surround their windows, so that only light from the cutting operation can reach the devices. Alternatively the light-conveying ducts may incorporate quartz rods.

In either arrangement regarding these ducts it is possible to dispense with an optical system.

Embodiments of the invention will now be described with reference to the accompanying drawings, in which:

FIG. 1 is a diagram in plan view, depicting an automatic flame-cutting machine according to the invention.

FIG. 2 is a front elevation of the torch and cutter head of a flame-cutting machine, showing two photo-electric devices therewith, one of which is shown partly in section.

FIG. 3 is a similar view to FIG. 2, but shows only one photo-electric device, of modified construction, in section elevation.

Referring to FIG. 1 of the drawings, a flame-cutting machine, e.g. for cutting contoured plates from sheet metal, comprises a cutter head 10 which is movable on a transverse beam 11 by means of an electric motor 12, while the beam 11 is movable bodily along guides 13 by another electric motor 14. A flame-cutting machine of this type is generally well-known so far as already described, and since the general construction of the machine forms no part of the present invention it will not be further described.

The energising of the driving motors 12 to cause movement of the cutter head 10 over a desired path is depicted in FIG. 1 as being under the control of an electrical unit 15, the precise nature of which is immaterial as regards the present invention. For example the unit 15 may be a line-following device, or a decoder which is interpreting information stored in a pre-recorded record, the unit 15 feeding appropriate signals to the motors 12 and 14 as indicated diagrammatically in the drawing. The cutter head 10 is shown as supporting a torch 16, and disposed at different angular positions at a spacing of 180° about the axis of the torch 16 are two photo-electric devices 17 which are also carried by the cutter head 10.

Light emitted during a cutting operation by the torch 16 impinges upon both the photo-electric device 17, and as shown in the drawing, they are in parallel with each other, their combined output being fed to an electrical control unit indicated at 18. Again, the precise nature of the electrical control unit 18 is immaterial as regards the present invention, but its function is to halt the motion of the cutter head 10 by the motors 12 and 14 when the combined output of the devices 17 indicates loss of cut or extinction of the preheat flame of the torch.

By way of example only, the unit 18 could be a relay which operates to stop electrical input to the unit 15 and the motors 12, 14 if the combined output of the devices 17 drops to a predetermined low, indicating loss of cut by the torch 16, or is non-existant due to extinction of the preheat flame, and will not allow the motors to restart for automatic operation of the machine until the cut is restored. As regards loss or absence of preheat flame, it will obviously be desirable that if the photo-electric devices detect the absence of preheat flame some measure of control of the gas supply to the torch should ensue. This is provided for in practice, but forms no part of the present invention of providing more than one photo-electric device to receive light from the torch.

It will be seen that with the two devices 17 at 180° to each other, as shown in FIG. 1, the disadvantages above-mentioned when only one device is employed are overcome. The two devices 17 need not be spaced at 180° to each other, but it is envisaged that they should not be spaced less than 90° apart, and more than two devices could be employed if desired.

Referring to FIG. 2 of the drawings, a cutter head 19 carries a cutting torch 20, and secured to the head 19 is a bracket 21 from which extend two opposed struts 22. An adjustable mounting clamp 23 is provided at the outer end of each strut 22, and to each clamp 23 is secured a photo-electric device indicated generally by the reference numeral 24. The two devices 24 are identical, and the one which is shown partly in section can be seen to comprise a head portion 26 which houses a removable photo-electric cell 27. A light-conveying duct in the form of a metal tube 28 extends from the vicinity of the tip of the cutting torch 20 to the head portion 26 which houses the cell 27. The cell 27 is therefore located at a safe distance from the tip of the torch 20 as regards heating, and the metal tube acts to convey light to the cell 27 from the torch tip region while excluding extraneous light from the cell. The tubes 28 may be of other suitable opaque material.

In the construction shown in FIG. 3 a cutter head 29 carries a cutting torch 30, and secured to the head 29 is a bracket 31 from which extend two opposed struts 32. Each strut 32 carries a photo-electric device, but as they are identical only one is shown in the drawing, the strut 32 being provided with a clamp 33 to which is adjustably secured a photo-electric device indicated generally by the reference numeral 34. A photo-electric cell 35 is removable mounted within a tubular opaque body 36.

A cap portion 37 is secured to the lower end of the body 36, and an aperture 38 in the cap 37 serves as an inner window which admits light to the interior thereof. Light entering via the inner window 38 is conveyed to the cell 35 by a quartz rod 39, which may be parallel-sided, as shown in full lines, or may taper as indicated in chain-dot lines at 39$^x$.

The inner window 38 is at the inner end of a tubular extension 40 of the cap portion 37, said tubular extension 40 being inclined to the longitudinal axis of the body 36 so that its own axis is directed at the tip of the torch 30. The tubular extension 40 is internally screw-threaded to receive a correspondingly screw-threaded tubular member 41 having an aperture 42 therein which serves as an outer window for the admission of light from the region of the tip of the torch 30. The inner window 38 is masked by a transparent shield 43, preferably of transparent plastic material such as acrylic resin, which we have discovered to possess the unusual property that flying oxide particles emitted in the zone of a flame-cutting operation do not adhere thereto. The cell 35 is located at a safe distance from the tip of the torch 30 as regards heating, extraneous light is excluded from the cell and it is protected from damage by flying oxide particles.

What we claim is:

1. In an automatic cutting machine, the combination of a cutter head, a torch carried by said head, electric drive means for moving said head in all directions in a horizontal plane, electrical circuitry including electrical control means for controlling energisation of said drive means, at least two photo-electric devices supported by said head and disposed at different angular positions about the axis of the torch and cutter head and located so that light emitted during a cutting operation by said torch impinges equally on both said devices for producing an electrical output from each device, said devices being in parallel in said circuitry and the circuitry including electrical control means for halting the motion of the cutter head by said drive means in response to the combined output of said devices being indicative of loss of cut or extinction of the preheat flame of the torch.

2. In an automatic cutting machine, the combination of a cutter head, a torch carried by said head, electric drive means for moving said head in all directions in a horizontal plane, electrical circuitry including electrical control means for controlling energisation of said drive means, at least two photo-electric devices supported by said head and disposed at an angular spacing of at least 90° about the axis of the torch and cutter head and located so that light emitted during a cutting operation by said torch impinges equally on both said devices for producing an electrical output from each device, said devices being in parallel in said circuitary and the circuitry including electrical control means for halting the motion of the cutter head by said drive means in response to the combined output of said devices being indicative of loss of cut or extinction of the preheat flame of the torch.

References Cited in the file of this patent

UNITED STATES PATENTS

| | | |
|---|---|---|
| 2,089,029 | Jones | Aug. 3, 1937 |
| 2,177,276 | Bucknam | Oct. 24, 1939 |
| 2,419,641 | Hart | Apr. 29, 1947 |
| 2,494,663 | Lobosco | Jan. 17, 1950 |
| 2,843,007 | Galey et al. | July 15, 1958 |